US008972279B2

(12) United States Patent  (10) Patent No.: US 8,972,279 B2
Cole et al.  (45) Date of Patent: *Mar. 3, 2015

(54) MATCHING AUDIO ADVERTISEMENTS TO ITEMS ON A SHOPPING LIST IN A MOBILE DEVICE

(75) Inventors: Alan G. Cole, Katonah, NY (US);
Siddique A. Mohammed, Bangalore (IN); Victor S. Moore, Lake City, FL (US); Dhandapani Shanmugam, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 22 days.

This patent is subject to a terminal disclaimer.

(21) Appl. No.: 13/546,176

(22) Filed: Jul. 11, 2012

(65) Prior Publication Data

US 2014/0019243 A1    Jan. 16, 2014

(51) Int. Cl.
*G06Q 30/02*    (2012.01)

(52) U.S. Cl.
USPC .................................. 705/14.49; 705/14.54

(58) Field of Classification Search
CPC ..................................................... G06Q 30/02
USPC ........................................... 705/14.54, 14.49
See application file for complete search history.

(56) References Cited

U.S. PATENT DOCUMENTS

| 6,941,275 | B1 | 9/2005 | Swierczek |
| 2003/0126013 | A1* | 7/2003 | Shand .............................. 705/14 |
| 2005/0075940 | A1 | 4/2005 | DeAngelis et al. |
| 2008/0059323 | A1 | 3/2008 | Chang et al. |
| 2009/0006181 | A1* | 1/2009 | Ghosh et al. ..................... 705/10 |
| 2009/0157472 | A1 | 6/2009 | Burazin et al. |
| 2009/0265163 | A1 | 10/2009 | Li et al. |
| 2010/0086107 | A1* | 4/2010 | Tzruya ........................ 379/88.01 |
| 2010/0138271 | A1* | 6/2010 | Henkin et al. ................... 705/10 |
| 2010/0262554 | A1 | 10/2010 | Elliott et al. |
| 2013/0046648 | A1* | 2/2013 | Calman et al. ............... 705/26.3 |
| 2013/0117106 | A1* | 5/2013 | Glassman et al. .......... 705/14.53 |

* cited by examiner

*Primary Examiner* — John G Weiss
*Assistant Examiner* — Adam Chornesky
(74) *Attorney, Agent, or Firm* — Ryan, Mason & Lewis, LLP

(57) ABSTRACT

Methods and apparatus are provided for matching audio advertisements to items on a shopping list in a mobile device. Audio advertisements are matched to items on a shopping list by obtaining the shopping list from a mobile device of the user; applying a speech recognizer to at least one audio advertisement detected on a microphone of the mobile device; identifying one or more key words in the at least one audio advertisement; comparing the one or more identified key words to one or more items on the shopping list stored on the mobile device; and storing the information related to the at least one advertisement if the one or more identified key words match the one or more items.

6 Claims, 5 Drawing Sheets

FIG. 4

THE BROADCASTED ADVERTISEMENT CONTENT

SUMMER SALE!!!! SUMMER THIS YEAR HAS ARRIVED SOON.... TO FIGHT BAD ODOUR, Style4U HAS SPECIAL SUMMER OFFERS FOR PERFUMES/DEODORANTS. GET 30% ON ANY PURCHASE OF PREMIUM PERFUMES COSTING ABOVE $50

410

GENERATED ADVERTISEMENT TAG INFO

| | | |
|---|---|---|
| ADVERTISED NAME | : | Style4U |
| COMMODITY | : | PERFUMES/DEODORANTS |
| BRAND | : | PREMIUM |
| OFFER | : | 30% FOR PURCHASE ABOVE $50 |

420

400

MATCHING AUDIO ADVERTISEMENTS TO ITEMS ON A SHOPPING LIST IN A MOBILE DEVICE

FIELD OF THE INVENTION

The present invention relates to techniques for matching audio advertisements to items on a shopping list.

BACKGROUND OF THE INVENTION

In today's busy world, consumers and retailers alike often employ technology to improve the shopping experience. Retailers, for example, look to technology to lower the cost of each transaction and to employ targeted marketing techniques to present consumers with advertising that is targeted to the particular needs and habits of a given consumer.

Consumers often make purchases of household goods, for example, based on items listed on a shopping list. The traditional hand-written shopping list, however, is often replaced by a digital list stored in a mobile device of the user. Consumers can often dictate their shopping list into a mobile device. In addition, a number of techniques are known for automatically generating an electronic shopping list for a consumer (for example, with items from a selected recipe).

A number of techniques have been proposed or suggested for using mobile devices to improve the shopping experience for consumers and/or retailers. United States Published Patent Application No. 2008/0052168, for example, discloses techniques for providing targeted advertising to a group of individuals in public places and public carriers. United States Published Patent Application No. 2007/0174115 discloses techniques for presenting customized presentation offers to a consumer having a shopping device. In addition, United States Published Patent Application No. 2006/0047577 discloses techniques for matching a shopping list with an order that items are found in a given store.

While such technology advances have improved the shopping experience of consumers and/or retailers, a need still remains for improved techniques for making the shopping list in a mobile device more intelligent such that it can leverage the information from a number of different audio sources.

SUMMARY OF THE INVENTION

Generally, methods and apparatus are provided for matching audio advertisements to items on a shopping list in a mobile device. According to one aspect of the invention, one or more audio advertisements are matched to one or more items on a shopping list by obtaining the shopping list from a mobile device of the user; applying a speech recognizer to at least one audio advertisement detected on a microphone of the mobile device; identifying one or more key words in the at least one audio advertisement; comparing the one or more identified key words to one or more items on the shopping list stored on the mobile device; and storing the information related to the at least one advertisement if the one or more identified key words match the one or more items.

The stored information related to the at least one advertisement can optionally be presented to the user. Key words can optionally be extracted from the shopping list prior to applying the speech recognizer to the audio advertisements. The list of advertisements can optionally be ranked based on a relevance score. The identified key words from the advertisement can optionally be stored in a Dedicated Memory Location (DML).

A more complete understanding of the present invention, as well as further features and advantages of the present invention, will be obtained by reference to the following detailed description and drawings.

BRIEF DESCRIPTION OF THE DRAWINGS

FIG. 4 illustrates an exemplary advertisement record for a broadcast advertisement.

DETAILED DESCRIPTION OF PREFERRED EMBODIMENTS

The present invention provides methods and apparatus for matching audio advertisements to items on a shopping list in a mobile device. Generally, aspects of the present invention make shopping lists in mobile devices, such as smart phones, more intelligent and dynamic by applying speech recognition techniques to audio advertisements. According to one aspect of the invention, a speech recognizer converts audio advertisements to text or another relevant format in order to identify keywords of interest. The identified keywords can be matched to one or more items on the shopping list of a user. As used herein, a "shopping list" comprises any listing of one or more items to be purchased by a user, including an ingredient list, a shopping cart for an e-commerce web site, and "to do" entries on a calendar that are related to a purchase (such as "buy milk").

Figure 1:
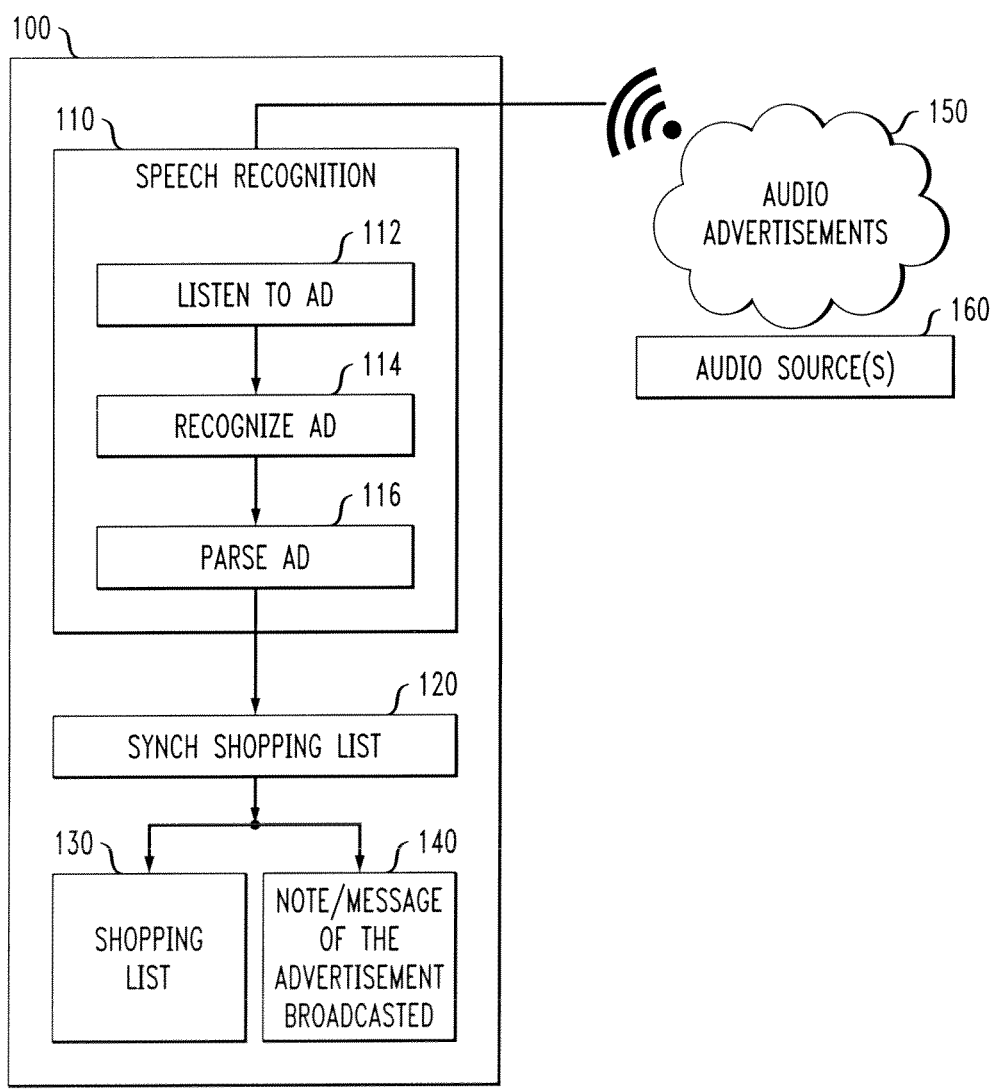
FIG. 1 illustrates an exemplary advertisement matching system that incorporates aspects of the present invention.

FIG. 1 illustrates an exemplary advertisement matching system 100 that incorporates aspects of the present invention. As shown in FIG. 1, the exemplary advertisement matching system 100 may be implemented on a mobile device, such as a smart phone, of a user. The exemplary advertisement matching system 100 comprises a speech recognition module 110 and a shopping list module 120. The exemplary speech recognition module 110 and shopping list module 120 may be implemented, for example, as client applications on the mobile device 100 of a user. The exemplary speech recognition module 110 listens to advertisements at stage 112, recognizes text from the advertisement at stage 114, and parses the advertisement at stage 116. It is noted that the speech recognition module 110 can perform speech recognition directly on the mobile device of the user, or may transmit the audio information to a server or another computing device to perform the speech recognition.

As discussed hereinafter, an advertisement matching process 200, as discussed further below in conjunction with FIG. 2, listens to audio advertisements 150 in a background mode, performs speech recognition on the advertisements using the speech recognition module 110 and then parses the recognized text of the advertisements to match the advertisements to items on a shopping list using the shopping list module 120. The audio advertisements 150 may be broadcasted, for example, from any audio source 160, such as radio or another audio source.

The exemplary shopping list module 120 synchronizes items on a shopping list 130 to generate the necessary notes and messages 140 from the audio advertisements 150, as discussed further below.

Figure 2:
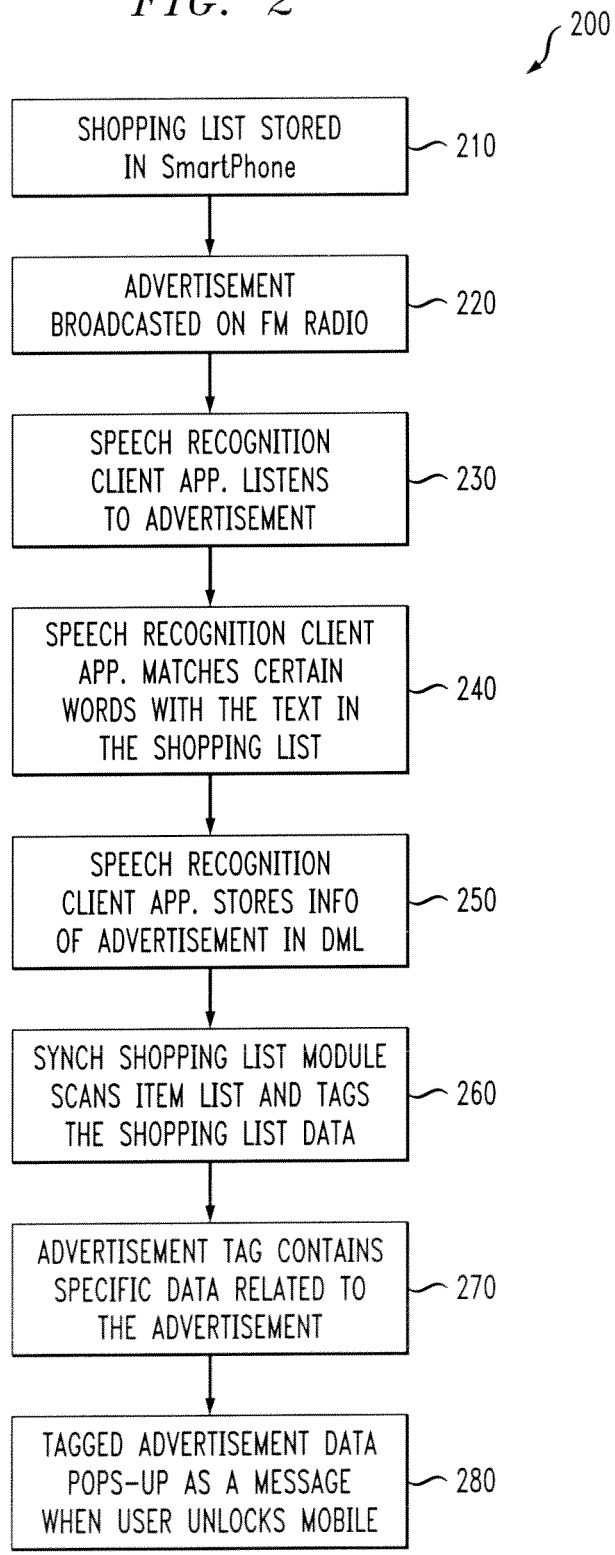
FIG. 2 is a flow chart describing an exemplary implementation of an advertisement matching process that incorporates aspects of the present invention.

FIG. 2 is a flow chart describing an exemplary implementation of an advertisement matching process 200 that incorporates aspects of the present invention. As shown in FIG. 2, the exemplary advertisement matching process 200 initially stores the shopping list 130 in the mobile device 100 of the user during step 210.

Thereafter, one or more advertisements 150 are broadcasted, for example, from an FM radio or another audio source during step 220. The speech recognition module 110 listens to the advertisements 150 in a background mode during step 230. The speech recognition module 110 matches certain words from the advertisements 150 to items in the shopping list 130 during step 240.

Thereafter, the speech recognition module 110 stores information from the advertisement 150 during step 250 in a Dedicated Memory Location (DML) 400, as discussed further below in conjunction with FIG. 4. The exemplary shopping list module 120 scans the items in the shopping list 130 during step 260 and tags the shopping list data 300, as discussed further below in conjunction with FIG. 3, with the information from the advertisement 150.

As shown in step 270 and as discussed further below in conjunction with FIGS. 3 and 4, the tag for the advertisement 150 contains specific data related to the advertisement 150. As shown in FIG. 2, the tag for the advertisement 150 optionally pops up as a message to the user during step 280 when the user activates the mobile device 100.

Figure 3:
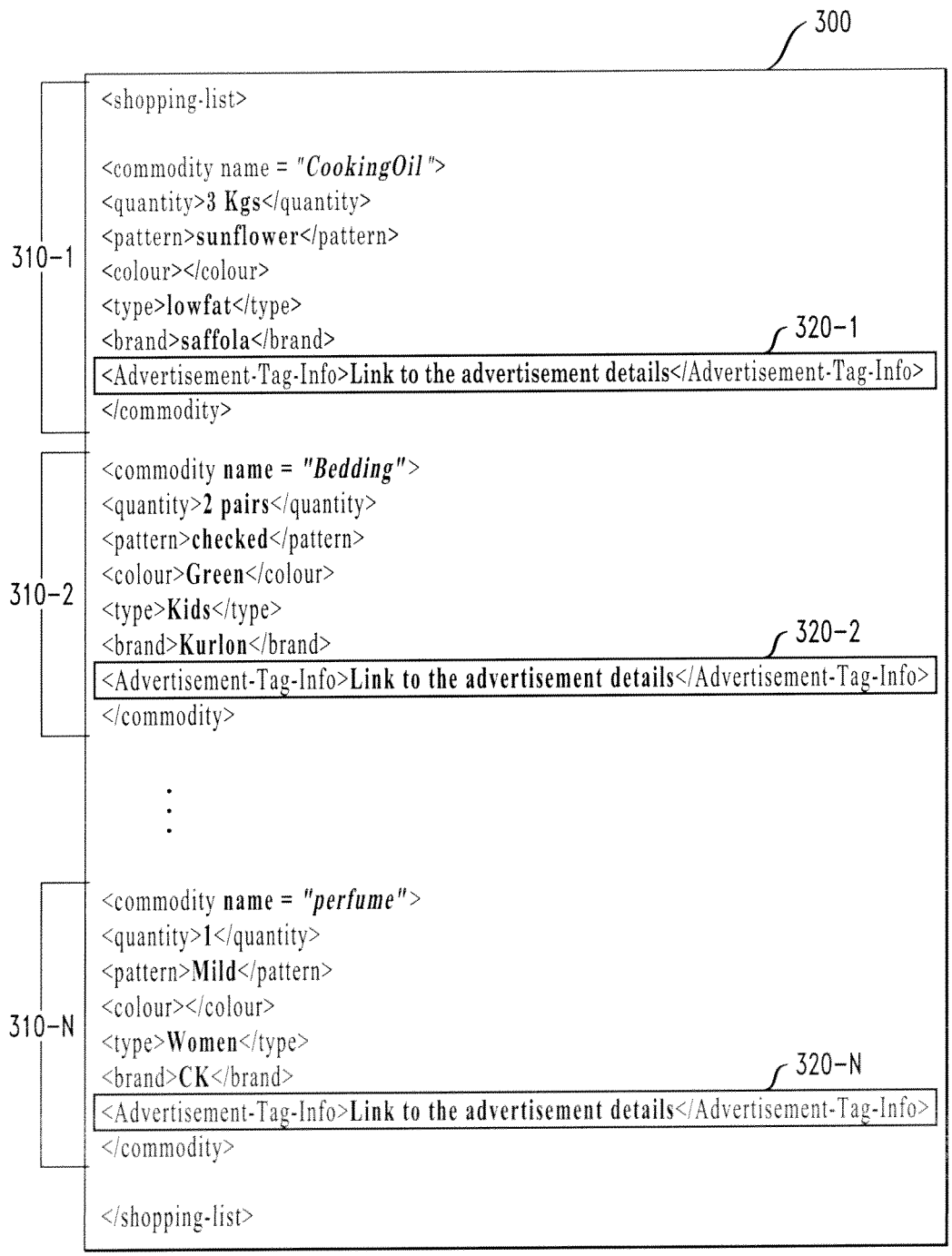
FIG. 3 illustrates exemplary shopping list data 300 for a shopping list residing on a mobile device of a user.

FIG. 3 illustrates exemplary shopping list data 300 for a shopping list 130 residing on a mobile device 100 of a user. The exemplary shopping list data 300 comprises a plurality of records 310-1 through 310-N, each associated with a different item in the shopping list 130. Each exemplary record 310 identifies the item by one or more of name, quantity, pattern, color, type and brand. In addition, each exemplary record 310 comprises exemplary advertising tag information 320, such as a link to the details of the advertisement 150.

FIG. 4 illustrates an exemplary advertisement record 400 for a broadcast advertisement 150. The exemplary advertisement record 400 comprises a field 410 containing the transcribed text of the broadcasted advertisement 150 and a field 420 comprising the generated information for the Advertisement Tag 320. The exemplary field 420 comprises an advertiser name, a commodity name, a brand name and a summary of the offer.

While FIG. 2 shows an exemplary sequence of steps, it is also an embodiment of the present invention that these sequences may be varied. Various permutations of the algorithms are contemplated as alternate embodiments of the invention.

While exemplary embodiments of the present invention have been described with respect to processing steps in a software program, as would be apparent to one skilled in the art, various functions may be implemented in the digital domain as processing steps in a software program, in hardware by a programmed general-purpose computer, circuit elements or state machines, or in combination of both software and hardware. Such software may be employed in, for example, a hardware device, such as a digital signal processor, application specific integrated circuit, micro-controller, or general-purpose computer. Such hardware and software may be embodied within circuits implemented within an integrated circuit.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 5:
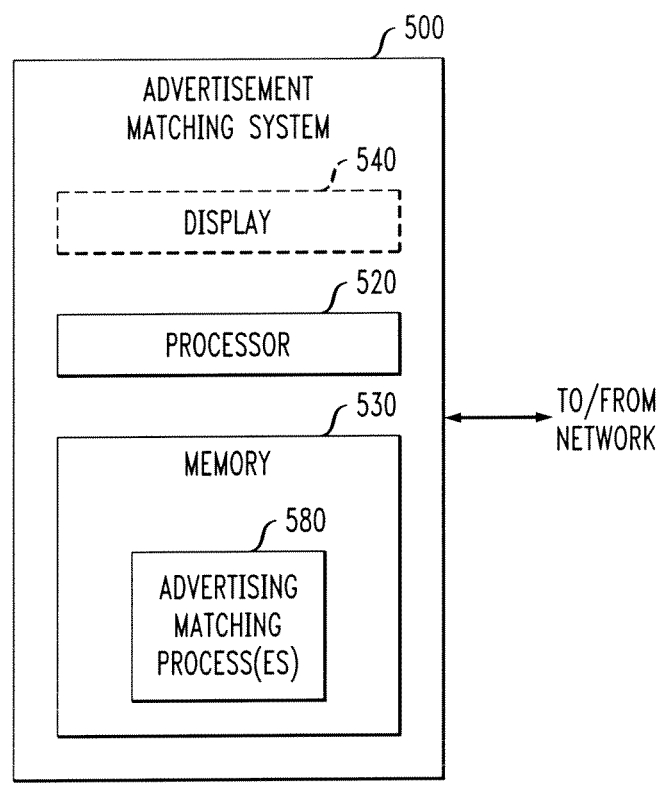
FIG. 5 is a block diagram of an advertisement matching system that can implement the processes of the present invention.

FIG. 5 is a block diagram of an advertisement matching system 500 that can implement the processes of the present invention. As shown in FIG. 5, memory 530 configures the processor 520 to implement the advertisement matching methods, steps, and functions disclosed herein (collectively, shown as 580 in FIG. 5). The memory 530 could be distributed or local and the processor 520 could be distributed or singular. The memory 530 could be implemented as an electrical, magnetic or optical memory, or any combination of these or other types of storage devices. It should be noted that each distributed processor that makes up processor 520 generally contains its own addressable memory space. It should also be noted that some or all of computer system 500 can be incorporated into a personal computer, laptop computer, handheld computing device, application-specific circuit or general-use integrated circuit.

The flowcharts and block diagrams in the Figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is to be understood that the embodiments and variations shown and described herein are merely illustrative of the principles of this invention and that various modifications may be implemented by those skilled in the art without departing from the scope and spirit of the invention.

What is claimed is:

1. A method for matching one or more audio advertisements to one or more items on a shopping list, comprising:
   obtaining, on a mobile device, said shopping list generated by a user associated with said mobile device;
   detecting, via a microphone of said mobile device, at least one audio advertisement broadcast by an entity that is not associated with said mobile device;
   applying a speech recognizer to said at least one detected audio advertisement to identify one or more key words in said at least one detected audio advertisement;
   comparing said one or more identified key words to one or more items on said shopping list stored on said mobile device; and
   storing said information related to said at least one detected audio advertisement if said one or more identified key words match said one or more items;
   wherein said obtaining, said detecting, said applying, said comparing, and said storing are carried out by a computing device.

2. The method of claim 1, further comprising the step of presenting said stored information related to said at least one advertisement to said user.

3. The method of claim 1, further comprising the step of extracting one or more key words from said shopping list prior to said step of applying a speech recognizer to at least one audio advertisement.

4. The method of claim 1, further comprising the step of ranking a plurality of advertisements based on a relevance score.

5. The method of claim 1, further comprising the step of storing said identified one or more key words in said at least one audio advertisement in a Dedicated Memory Location (DML).

6. The method of claim 1, wherein said speech recognizer executes on one or more of said mobile device of said user and another computing device.

* * * * *